UNITED STATES PATENT OFFICE.

JOSEPH ARNDTS, OF PADERBORN, GERMANY.

METHOD OF MAKING DURABLE SOLUTIONS OF PEROXID OF HYDROGEN.

946,529.  Specification of Letters Patent.  Patented Jan. 18, 1910.

No Drawing.  Application filed April 13, 1908.  Serial No. 426,838.

*To all whom it may concern:*

Be it known that I, JOSEPH ARNDTS, a subject of the German Emperor, and resident of Paderborn, Germany, have invented certain new and useful Improvements in Methods of Making Durable Solutions of Peroxid of Hydrogen, of which the following is a specification.

As it is known that the organic products of the class of tannic acid, as well as the pyrogallic and gallic acid, possess the property to absorb, especially in the presence of alkalies, large quantities of oxygen, I tried to find out whether said products were also capable to act against the tendency, of the peroxid of hydrogen, to separate oxygen. By experiments I learned that already by a very small addition of tannic acid, or also of pyrogallic or gallic acid, to solutions of peroxid of hydrogen the decomposition of the peroxid of hydrogen is considerably reduced.

As an example the following may serve:—

A peroxid of hydrogen of 3% to which very small quantities of tannic acid were added in a proportion of 1000:1, did not show any decomposition after six months.

The amount of the preservative agent to be added depends, of course, on the purity of the peroxid of hydrogen and on the temperature and intensity of light to which the peroxid of hydrogen is exposed.

Having fully described my invention, what I claim and desire to secure by Letters Patent is:—

A method of making durable solutions of peroxid of hydrogen, consisting in adding to said solutions tannic acid.

In testimony whereof I have hereunto set my hand in the presence of two subscribing witnesses.

JOS. ARNDTS.

Witnesses:
PETER LIEBER,
WILHELM FLASCHE.